Nov. 28, 1950   Z. A. MACKIEWICZ   2,531,450

ARC-OXYGEN UNDERWATER CUTTING TORCH

Filed Aug. 11, 1944

Inventor
ZYGMUNT A. MACKIEWICZ

By W. Glenn Jones

Attorney

Patented Nov. 28, 1950

2,531,450

UNITED STATES PATENT OFFICE 2,531,450

ARC-OXYGEN UNDERWATER CUTTING TORCH

Zygmunt A. Mackiewicz, United States Navy

Application August 11, 1944, Serial No. 549,090

3 Claims. (Cl. 219—15)

(Granted under the act of March 3, 1883, as amended April 30, 1928; 370 O. G. 757)

This invention deals with arc-oxygen cutting torches for use in underwater operations.

In underwater operations, one of the difficulties, where metal chucks are used for holding the electrodes, is that the threads in the chucks are corroded by electrolytic action and thus prevent proper manipulation of the chucks, so that good sealing is impossible. As a result of this, arcing is produced, followed by further deformation of the threads and other connecting parts.

Another difficulty in underwater operations is that, where flash-back occurs and damages rubber hose lines or fittings, a replacement of the rubber hose connection is made necessary. This is a time consuming procedure and may be a frequently recurring one in the case of a careless or inexperienced operator who often neglects to turn on the oxygen valve before signalling for "current on."

Furthermore, torches for this work have usually been made of special and sometimes very complicated parts, difficult to procure in the first place and much more difficult to repair because of the difficulty in getting replacement parts.

The present invention has been produced to avoid the above-mentioned difficulties by constructing a torch of simple design, which can be readily made of standard parts, and which will avoid the difficulties resulting from corrosion and flash-back.

The object of the present device is to make a construction which will avoid the passage of current through the oxygen valve, eliminate the use of cumbersome chuck means for gripping the electrode, and, in case of flash-back which might injure the insulation in the torch, will permit easy replacement of the insulation.

A further object is to construct the present torch of standard pipe fittings and other standard supplies, so that it might be readily made in the field.

Other and more specific objects of this invention will become apparent as the detailed description of one specific form of this device proceeds, in connection with the accompanying drawings, wherein.

Figure 1:
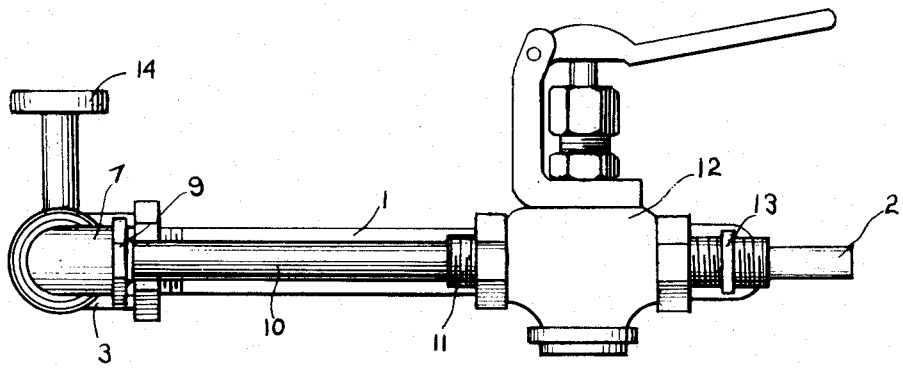
Fig. 1 is a plan view of one preferred form of the present device.
Figure 2:
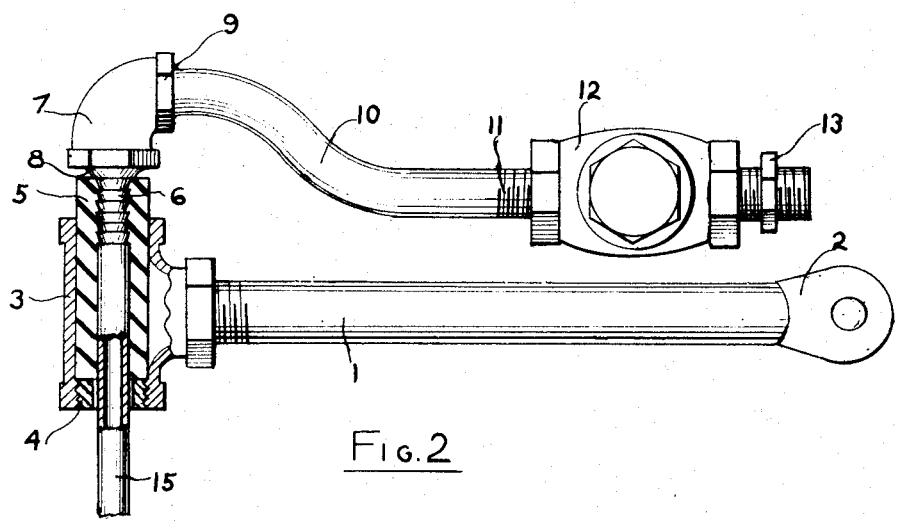
Fig. 2 is a side view, partially in section, of the same.

As may be seen in the drawings, the torch is made of a piece of pipe 1, flattened at one end 2 to make an electrical connection for the torch, a standard T connection 3 fitted on the other end thereof and having inserted into one end of it a bushing 4, in which the inner thread has been reamed out to a diameter slightly larger than that of the standard tubular electrode 15. A rubber hose connection 5 is fitted into the other end of the T, extending up to the bushing and projecting for a short distance from the end of the T into which it is inserted. Into this end of the rubber hose connection is inserted a half of hose splice fitting 6 which is brazed to one end of an elbow fitting 7 to the other end of which is brazed a piece of copper tubing 10, bent as shown and soldered to a threaded nipple 11 at the other end for connection to a Lukenheimer valve 12. A double male fitting 13 is inserted into the other end of the valve for connection to the oxygen line (not shown). A clamping screw 14 is fitted in the T connection through the bushing to clamp the electrode, which is mounted in place by pushing its end part way into the hose connection.

Thus we have a simple construction using only standard parts easily put together and generally available. In case of flash-back which may injure the hose connection, it is easily replaced by simply removing the injured connection and replacing it by a fresh one.

In a specific form of this construction, for purposes of illustration, the following standard parts may be used to make up the entire torch: a ¼"-200 Lukenheimer oxygen valve, having a $\frac{1}{16}$" double male fitting connected at one end, a ⅜" copper tubing soldered at one end to a ⅝" x ¼" nipple threaded to the other end of the valve, the other end of the copper tubing being brazed to a ⅛" 90° L, a half of a ¼" oxygen hose splice brazed to the other end of the L, a piece of oxygen hose ¼" x 1⅝" fitted over the end of this hose splice is pressed into one end of the top of a standard ⅜" pipe T, a ½" x ⅜" brass bushing is screwed into the other end of the top of the T fitting, this bushing having its inner thread reamed out to a diameter of $2\frac{1}{64}$", a ⅝" x ¼" x 20 set screw is used for clamping the electrode after it is pushed into the hose connection from the bushing end of the T, the bushing and T being appropriately tapped for this purpose, into the bottom of the T is screwed an 11" piece of ⅜" standard pipe flattened at its other end for electrical connection to the power line by having a $\frac{7}{16}$" hole bored therethrough.

Various modifications in sizes, shapes and arrangements of parts may be made in constructing this device without departing from the spirit and scope of the invention as defined in the appended claims.

The invention described herein may be manufactured and used by or for the Government of the United States of America for governmental purposes without the payment of any royalties thereon or therefor.

What is claimed is:

1. An oxy-arc torch comprising a length of standard pipe having a flattened end bored through for electrical connection, a standard T fitted on its other end having a bushing threaded into one end thereof and a piece of oxygen hose pushed in through the other end of the T and extending down to the bushing, a short end of this hose projecting from the T, a standard elbow fitting having a half of a hose splice fitting brazed to one end thereof and a piece of copper tubing brazed to the other end thereof, the hose splice fitting being inserted into the projecting end of the oxygen hose, an oxygen valve having one side connected to the other end of the copper tubing and having a double male fitting for connection to an oxygen supply at its other side, and a clamping screw fitted through the T and the bushing for clamping a tubular electrode.

2. In an oxy-arc torch, a head comprised of a standard pipe T having a bushing screwed into one end thereof, said bushing having an inside diameter sufficient to clear the outside diameter of the electrodes to be used, and a piece of oxygen hose fitted through the other end of the T and extending to said bushing, a short portion of the other end of said hose projecting from the T for connection to the oxygen supply, said hose having an inside diameter to fit snugly over said electrodes.

3. In an oxy-arc torch a head comprised of a standard pipe T having a bushing screwed into one end thereof and a piece of oxygen hose fitted through the other end thereof and extending to said bushing, a short portion of the other end of said hose projecting from the T for connection to the oxygen supply, and a clamping screw fitted through the T and the bushing adapted for clamping an electrode after it is pushed part way into the hose.

ZYGMUNT A. MACKIEWICZ.

REFERENCES CITED

The following references are of record in the file of this patent:

UNITED STATES PATENTS

| Number | Name | Date |
|---|---|---|
| 1,687,081 | Chapman | Oct. 9, 1928 |
| 2,210,640 | Swafford | Aug. 6, 1940 |

FOREIGN PATENTS

| Number | Country | Date |
|---|---|---|
| 236,098 | Great Britain | July 2, 1925 |